Feb. 4, 1958 N. BARTLETT 2,822,173
AMUSEMENT RIDE
Original Filed Oct. 29, 1953 3 Sheets-Sheet 3
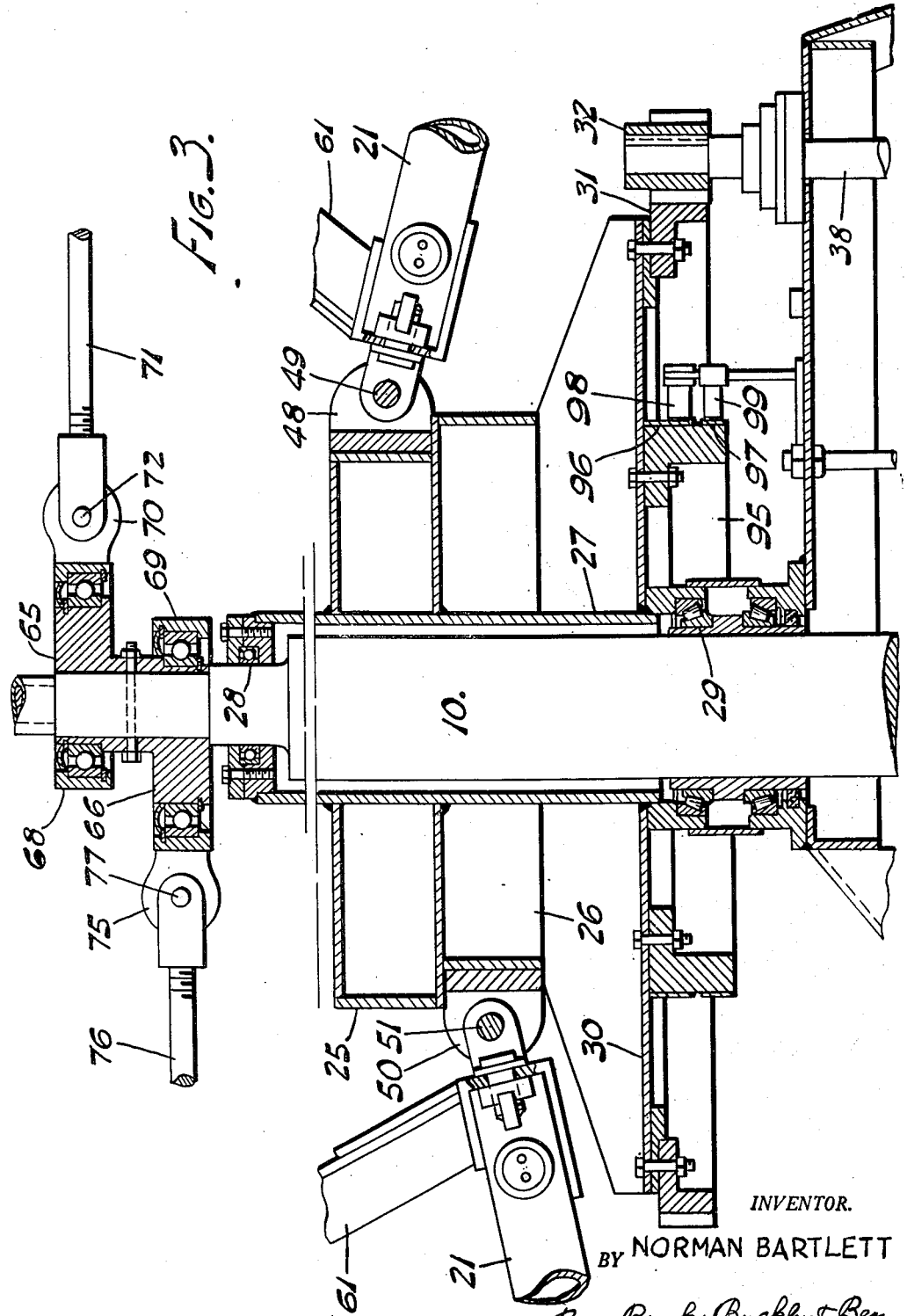
INVENTOR.
BY NORMAN BARTLETT
ATTORNEYS.

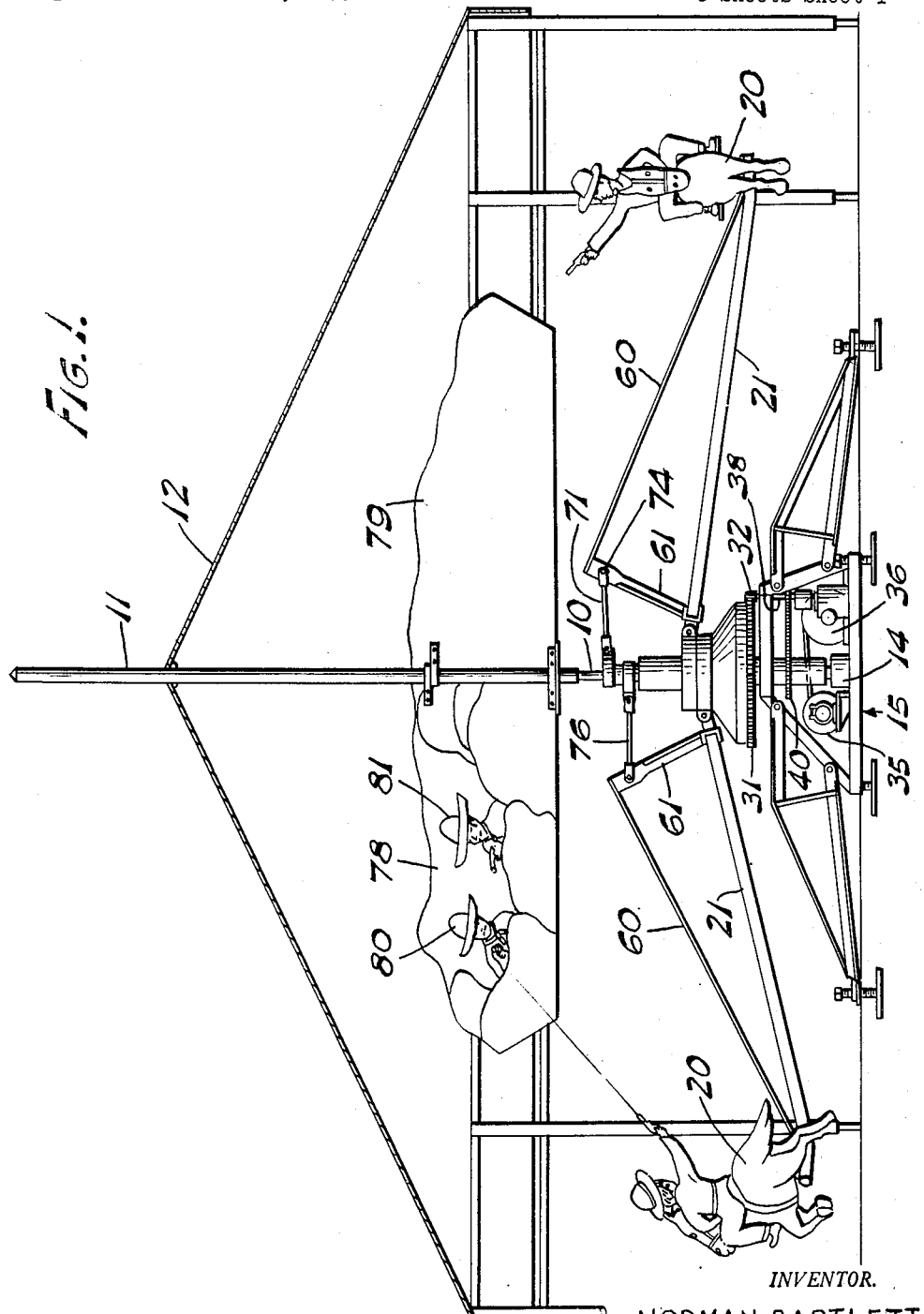

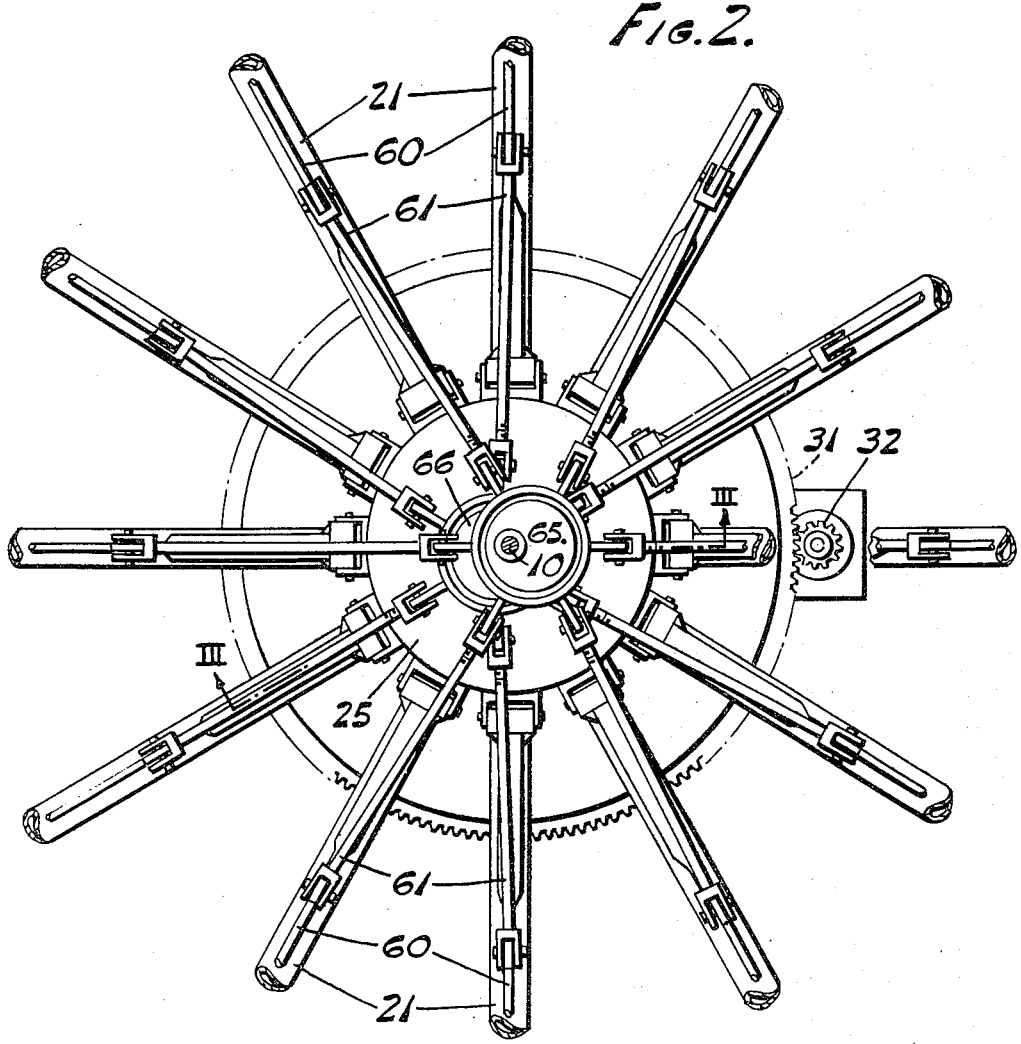

United States Patent Office 2,822,173
Patented Feb. 4, 1958

2,822,173

AMUSEMENT RIDE

Norman Bartlett, Uleta, Fla., assignor of one-half to Marjorie Bartlett, Uleta, Fla.

Original application October 29, 1953, Serial No. 389,074. Divided and this application October 6, 1955, Serial No. 538,950

4 Claims. (Cl. 272—36)

This invention relates to amusement rides and particularly to improvements in amusement rides of the roundabout type. This application is a division of my co-pending application Serial No. 389,074, filed October 29, 1953.

The present invention provides a ride of the roundabout type wherein the passenger compartments or passenger supporting figures or the like are disposed at the outer ends of a plurality of radiating arms, which arms are adapted to raise and lower as they rotate about a fixed vertical axis. A novel drive arrangement is provided whereby alternate arms in the circular series move upwardly as the intervening alternate arms move downwardly, so that one passenger or rider is moving upwardly as the passengers or riders immediately in front of and behind him are moving downwardly. The drive arrangement is further such that one rider or passenger reaches the high point in his vertical oscillation at the same time that the passengers in front of and behind him reach the lowest point in their vertical reciprocations, and vice versa.

In the drawings:

Fig. 1 is a general elevational view of one form of the ride of the present invention with portions thereof shown in cross-section for added clearness;

Fig. 2 is a fragmentary top plan view of the central drive portion of the ride shown in Fig. 1; and Fig. 3 is a fragmentary elevational view on a larger scale taken approximately on the line III—III of Fig. 2.

Like characters of reference denote like parts throughout the several figures of the drawings. The ride of the present invention is generally of the roundabout type and comprises a vertical central rotatable shaft member 10 and a relatively stationary vertical mast member 11 surmounting and supported by the shaft 10, the stationary mast 11 comprising a central vertical tent pole for supporting the central portion of a circular canopy member 12 as shown in Fig. 1. Shaft 10 has rotatable bearing at its lower end in a bearing member 14 which is included in a structural framework which is designated generally by the numeral 15 in Fig. 1 and includes any desired form of means for tying the framework to the ground or other surface where the ride of the present invention is to be used.

In the present instance the ride is of the carrousel or merry-go-round type and is shown to include a circular series of animal simulating figures designated 20. In the present instance there are twelve animal figures 20, each of which is supported at the outer end of an arm 21 with the several arms 21 radiating centrally from the axis of shaft 10. The arms 21 are pivotally supported at their inner ends for swinging movement to raise and lower the animal figures 20 as they pursue a circular course about mast 10.

Each arm 21 is alternately raised and lowered during operation of the ride and it is desired that each arm be raised and lowered in an opposite phase to that of the immediately forward and immediately rearward adjacent arm. Thus in the present instance six alternately disposed arms will be reaching their highest point in the raising movement at the same instant that the intervening six arms are reaching their lowest point. Novel means are provided for effecting this desired relationship of the raising and lowering movements of the various arms 21, as will be hereinafter described.

Referring to Figs. 2 and 3, and particularly the latter, a pair of circular drum members 25 and 26 are fixed one above the other about a sleeve or tube member 27 which has antifriction bearing support on shaft 10 at its upper and lower ends as at 28 and 29, respectively. A circular plate 30 is fixed to the lower end of tube 27 and has secured thereto a ring gear 31 which meshes with a drive pinion 32.

Referring to Fig. 1, framework 15 supports an electric driving motor 35 which has belt and pulley or chain and sprocket connection with the input shaft of a speed reducer 36 whose output shaft in the present instance extends vertically and is designated 38. Pinion 32 is fixed to the upper end of shaft 38 and the latter further has secured thereto a sprocket member which is part of a chain and sprocket drive designated 40 in Fig. 1, the companion sprocket being fixed to the lower portion of mast 10.

From the foregoing it will be seen that, with the output shaft 38 of the speed reducer rotating in a given direction, shaft 10 will be rotated in the same direction because of the chain and sprocket connection 40, while sleeve 27 will be rotated in an opposite direction because of the pinion and gear connection 32, 31. Thus the relative rotation as between mast 10 and sleeve 27 which carries the drum members 25 and 26 will be the sum of their separate rotations in opposite directions.

Referring to Fig. 3, a radiating support arm 21 is pivoted to a lug 48 on drum member 25 as at 49 and another of the radiating arms 21 is pivoted to a lug 50 on drum member 26 as at 51. Thus six alternately occurring radiating arms 21 are pivoted at their inner ends to drum member 25 and the six intervening radiating arms 21 are similarly pivoted to drum member 26. From this it will be seen that each of the radiating arms 21 is adapted to be rotated by and upon rotation of sleeve 27 and the arms 21 are each further mounted for raising and lowering movements about their several pivotal connections 49 and 51.

Each of the arms 21 is provided with an upper brace member 60 and an inner strut member 61 whereby the several arms 21 together with their braces 60 and strut members 61 each form a rigid truss or A-frame, this construction being provided for rigidity and also to facilitate imparting raising and lowering movements to the several arms 21 as will now appear.

Having reference now to Figs. 2 and 3, a pair of circular eccentric block members 65 and 66 are fixed one above the other to the rotatable shaft 10 for rotation therewith. An eccentric strap or sheave 68 has antifriction rotatable engagement about eccentric 65 and a second eccentric strap or sheave 69 likewise has antifriction rotatable engagement about eccentric 66. Eccentric strap 68 is provided with six equally spaced radiating lugs 70 each of which has pivotal connection with the inner end of a link 71 as at 72.

Each link 71 is pivotally connected as at 74 in Fig. 1 with a strut member 61 of one of the radiating arm members 21 of the group of arm members which are pivotally attached to drum member 25. Similarly, eccentric strap 69 is provided with six radiating lugs 75 each of which has pivotal engagement with the inner end of a link 76 as at 77, the outer end of each link 76 being connected to one of the strut members 61 of the group of arms 21 which have pivotal connection with the lower drum member 26.

In the position shown in Fig. 2 the upper eccentric 65 has its highest point or top dead-center point directly to the right of the axis of shaft 10 as viewed in Fig. 2, while the lower eccentric 66 has its lowest point or bottom dead-center point located at or directed toward the arm 21 which is displaced 30 degrees from the top dead-center point of eccentric 65 in a counterclockwise direction, this 30 degrees displacement being equal to the annular spacing of the several radiating arms 21. Thus when a given arm 21 has reached its bottom extreme position during the operation of its associated eccentric lifting and lowering mechanism the arm directly behind will have reached its highest point of lift through operation of its related eccentric lifting and lowering mechanism. This eccentric arrangement imparts a maximum appearance of lifting and lowering movement of the passenger supporting devices with a given actual amplitude of movement.

Referring to Fig. 1, a pair of target panels 78 and 79 are fixed to central mast 11 and radiate outwardly therefrom in opposite directions. The rotation of the ride being clockwise as viewed in plan, the riders approach the face of target 78 which is shown in Fig. 1 and subsequently approach the rear face of target 79 as there viewed, that being the front face as far as the riders are concerned.

In the present instance each of the target panels 78 and 79 has a pair of target figures 80 and 81 associated therewith as by being painted thereon or otherwise. The shooting and target portions of the ride form the subject matter of the aforesaid parent application, Serial No. 389,074 and are fully disclosed and described therein.

What is claimed is:

1. In an amusement ride of the roundabout type, a central vertical shaft and a support rotatable about the axis of said shaft, two sets of arms radiating from said support, each arm having a passenger supporting means at its outer end, means for rotating said support about the axis of said shaft, the arms of one set being spaced alternately between the arms of the other set as viewed from above, eccentric means carried by said shaft and having connection with the arms of one set to raise and lower said arms successively during rotation thereof, and other eccentric means carried by said shaft and having connection with the arms of the other set to raise and lower said arms successively during rotation thereof, said two eccentric means being disposed substantially oppositely whereby each arm of one set raises and lowers substantially oppositely with respect to an adjacent arm of the other set.

2. In an amusement ride of the roundabout type, a central vertical shaft and a support rotatable about the axis of said shaft, two sets of passenger supporting arms radiating from said support, each arm being pivoted to said support on a horizontal axis transverse with respect to the arm, means for rotating said support about the axis of said shaft, the arms of one set being spaced alternately between the arms of the other set as viewed from above, eccentric means carried by said shaft and having connection with the arms of one set to raise and lower said arms about their horizontal pivot axes successively during rotation of said support, and other eccentric means carried by said shaft and having connection with the arms of the other set to raise and lower said arms about their horizontal pivot axes successively during rotation thereof, said two eccentric means being disposed substantially oppositely whereby each arm of one set raises and lowers substantially oppositely with respect to an adjacent arm of the other set.

3. In an amusement ride of the roundabout type, a central vertical shaft and a support rotatable about the axis of said shaft, two sets of arms radiating from said support, each arm having a passenger receiving means at its outer end, means for rotating said support about said shaft, the arms of one set being spaced alternately between the arms of the other set as viewed from above, a pair of oppositely directed eccentrics fixed to said shaft, a strap about one of said eccentrics and having connection with the arms of one set to raise and lower said arms successively during rotation thereof, and a second strap about the other of said eccentrics and having connection with the arms of the other set to raise and lower said arms successively during rotation thereof, whereby each arm of one set raises and lowers substantially oppositely with respect to the adjacent arms of the other set.

4. In an amusement ride of the roundabout type, a central vertical shaft and a support rotatable about the axis of said shaft, two sets of passenger supporting arms radiating from said support, each arm being pivoted to said support on a horizontal axis transverse with respect to the arm, means for rotating said support about the axis of said shaft, the arms of one set being spaced alternately between the arms of the other set as viewed from above, a pair of oppositely directed eccentrics fixed to said shaft, a strap about one of said eccentrics and having connection with the arms of one set to raise and lower said arms about their horizontal pivot axes successively during rotation of said support, and a second strap about the other of said eccentrics and having connection with the arms of the other set to raise and lower said arms about their horizontal pivot axes successively during rotation thereof, whereby each arm of one set raises and lowers substantially oppositely with respect to the adjacent arms of the other set.

References Cited in the file of this patent

UNITED STATES PATENTS 2,113,131    Eyerly    Apr. 5, 1938

FOREIGN PATENTS 657,227    Great Britain    Sept. 12, 1951